(12) United States Patent
Brashear et al.

(10) Patent No.: US 11,519,773 B2
(45) Date of Patent: Dec. 6, 2022

(54) METHODS, SYSTEMS, AND APPARATUS FOR MASS FLOW VERIFICATION BASED ON CHOKED FLOW

(71) Applicant: Applied Materials, Inc., Santa Clara, CA (US)

(72) Inventors: Kevin M. Brashear, San Jose, CA (US); Zhiyuan Ye, San Jose, CA (US); Justin Hough, San Jose, CA (US); Jaidev Rajaram, Bangalore (IN); Marcel E. Josephson, San Jose, CA (US); Ashley M. Okada, San Jose, CA (US)

(73) Assignee: Applied Materials, Inc., Santa Clara, CA (US)

( * ) Notice: Subject to any disclaimer, the term of this patent is extended or adjusted under 35 U.S.C. 154(b) by 272 days.

(21) Appl. No.: 16/777,467

(22) Filed: Jan. 30, 2020

(65) Prior Publication Data

US 2020/0166400 A1   May 28, 2020

Related U.S. Application Data

(63) Continuation of application No. 15/194,360, filed on Jun. 27, 2016, now Pat. No. 10,684,159.

(51) Int. Cl.
*G01F 25/10* (2022.01)
*G01F 1/86* (2006.01)
*G01F 1/40* (2006.01)

(52) U.S. Cl.
CPC ............... *G01F 25/15* (2022.01); *G01F 1/40* (2013.01); *G01F 1/86* (2013.01)

(58) Field of Classification Search
CPC ..... G01F 1/36; G01F 1/37; G01F 1/40; G01F 1/42; G01F 1/44; G01F 1/46;
(Continued)

(56) References Cited

U.S. PATENT DOCUMENTS 3,927,563 A    12/1975  Konomi
5,627,328 A *   5/1997  Sheridan ............ G01N 33/0031
                                                73/863.83
(Continued)

FOREIGN PATENT DOCUMENTS

JP    2009116904 A    5/2009
TW    200710374 A     3/2007

OTHER PUBLICATIONS

International Preliminary Report on Patentability of International Application No. PCT/US2017/033073, dated Jan. 10, 2019.
(Continued)

*Primary Examiner* — Alexander A Mercado
(74) *Attorney, Agent, or Firm* — Lowenstein Sandler LLP

(57) ABSTRACT

Mass flow verification systems and apparatus may verify mass flow rates of mass flow controllers (MFCs) based on choked flow principles. These systems and apparatus may include a plurality of differently-sized flow restrictors coupled in parallel. A wide range of flow rates may be verified via selection of a flow path through one of the flow restrictors based on an MFC's set point. Mass flow rates may be determined via pressure and temperature measurements upstream of the flow restrictors under choked flow conditions. Methods of verifying a mass flow rate based on choked flow principles are also provided, as are other aspects.

14 Claims, 7 Drawing Sheets

(58) Field of Classification Search
CPC ............. G01F 25/0007; G01F 25/0053; G01F 25/0084; G01F 25/0092
See application file for complete search history.

(56) References Cited

U.S. PATENT DOCUMENTS

| | | | |
|---|---|---|---|
| 5,744,695 A | 4/1998 | Forbes | |
| 5,816,285 A * | 10/1998 | Ohmi | G05D 7/0635 137/486 |
| 5,951,770 A | 9/1999 | Perlov et al. | |
| 6,119,710 A | 9/2000 | Brown | |
| 6,164,276 A * | 12/2000 | Bathe | A61M 16/0677 128/203.14 |
| 6,287,386 B1 | 9/2001 | Perlov et al. | |
| 6,425,281 B1 * | 7/2002 | Sheriff | G01F 15/10 73/1.25 |
| 6,468,353 B1 | 10/2002 | Perlov et al. | |
| 6,575,737 B1 | 6/2003 | Perlov et al. | |
| 6,916,397 B2 | 7/2005 | Pfeiffer et al. | |
| 6,945,123 B1 * | 9/2005 | Kuehl | A61M 16/01 73/861.42 |
| 7,463,991 B2 | 12/2008 | Shajii et al. | |
| 7,720,655 B2 | 5/2010 | Rice | |
| 7,775,236 B2 * | 8/2010 | Gold | H01L 21/67098 137/487.5 |
| 8,714,781 B2 | 5/2014 | Nichol | |
| 8,905,074 B2 * | 12/2014 | Cobb | F16K 51/02 137/884 |
| 10,514,712 B2 * | 12/2019 | Ding | G01F 1/363 |
| 10,684,159 B2 | 6/2020 | Brashear et al. | |
| 2002/0082783 A1 | 6/2002 | Grosshart | |
| 2002/0169573 A1 * | 11/2002 | Reuschenbach | G05D 7/0635 702/100 |
| 2002/0170672 A1 | 11/2002 | Perlov et al. | |
| 2002/0174898 A1 * | 11/2002 | Lowery | G05D 7/0635 137/487.5 |
| 2002/0193911 A1 | 12/2002 | Horiuchi et al. | |
| 2003/0130807 A1 * | 7/2003 | Ambrosina | G01F 1/68 702/45 |
| 2004/0144178 A1 * | 7/2004 | Ohmi | G01L 9/025 73/708 |
| 2005/0000981 A1 | 1/2005 | Peng et al. | |
| 2005/0072716 A1 | 4/2005 | Quiles et al. | |
| 2005/0126265 A1 * | 6/2005 | Herzog | G01M 3/3236 73/49.2 |
| 2005/0189018 A1 * | 9/2005 | Brodeur | G05D 7/0635 137/487.5 |
| 2005/0241763 A1 * | 11/2005 | Huang | C23C 16/45561 156/345.33 |
| 2006/0011237 A1 * | 1/2006 | Tison | G01F 25/15 137/487.5 |
| 2006/0217900 A1 * | 9/2006 | Shajii | G01F 25/17 702/45 |
| 2006/0225482 A1 | 10/2006 | Silvis | |
| 2006/0236779 A1 * | 10/2006 | Atkinson | G01F 1/74 73/861.03 |
| 2006/0236781 A1 * | 10/2006 | Ohmi | G05D 7/0635 73/861.52 |
| 2006/0243060 A1 * | 11/2006 | Lane | C23C 16/45557 73/861 |
| 2006/0283254 A1 * | 12/2006 | Ding | G01F 25/15 73/700 |
| 2007/0043976 A1 | 2/2007 | Cunningham et al. | |
| 2008/0115560 A1 | 5/2008 | Shareef et al. | |
| 2008/0221822 A1 * | 9/2008 | Laverdiere | G01F 25/10 702/100 |
| 2009/0093774 A1 | 4/2009 | Wang et al. | |
| 2009/0108544 A1 | 4/2009 | Sico et al. | |
| 2009/0112491 A1 | 4/2009 | Nakada et al. | |
| 2009/0112504 A1 * | 4/2009 | Ding | G01F 22/02 702/100 |
| 2009/0146089 A1 * | 6/2009 | Moriya | G05D 7/0635 251/12 |
| 2009/0183549 A1 * | 7/2009 | Monkowski | G01F 25/17 73/861.52 |
| 2010/0229967 A1 | 9/2010 | Yasuda et al. | |
| 2012/0053860 A1 * | 3/2012 | Wheater | G01F 1/363 702/50 |
| 2012/0132291 A1 * | 5/2012 | Monkowski | G05D 7/0635 137/551 |
| 2012/0222495 A1 * | 9/2012 | Bates | G01N 1/24 73/861.61 |
| 2013/0036833 A1 | 2/2013 | Nakada | |
| 2013/0037003 A1 | 2/2013 | Sheerin | |
| 2013/0186486 A1 * | 7/2013 | Ding | G01F 15/005 137/487 |
| 2014/0033828 A1 | 2/2014 | Larson et al. | |
| 2014/0083514 A1 | 3/2014 | Ding | |
| 2014/0158211 A1 * | 6/2014 | Ding | G01F 15/003 137/486 |
| 2014/0182692 A1 * | 7/2014 | Hirata | G01F 1/6965 137/486 |
| 2014/0190579 A1 * | 7/2014 | Ding | G01F 15/005 137/487 |
| 2014/0262035 A1 | 9/2014 | Merry et al. | |
| 2014/0262036 A1 | 9/2014 | Reuter et al. | |
| 2014/0262755 A1 | 9/2014 | Deshmukh et al. | |
| 2014/0263165 A1 | 9/2014 | Hongkham et al. | |
| 2014/0271057 A1 | 9/2014 | Weaver et al. | |
| 2014/0273487 A1 | 9/2014 | Deshmukh et al. | |
| 2015/0013771 A1 | 1/2015 | Quiles et al. | |
| 2015/0045961 A1 | 2/2015 | Koshti et al. | |
| 2015/0059859 A1 | 3/2015 | Takahashi et al. | |
| 2015/0070814 A1 | 3/2015 | Parkhe et al. | |
| 2015/0082625 A1 | 3/2015 | Rice et al. | |
| 2015/0083330 A1 | 3/2015 | Madiwal et al. | |
| 2015/0090341 A1 | 4/2015 | Ng et al. | |
| 2015/0136248 A1 * | 5/2015 | Nagase | G01F 15/005 137/468 |
| 2015/0276554 A1 * | 10/2015 | Vertenoeuil | G01M 15/14 73/116.03 |
| 2015/0323361 A1 * | 11/2015 | Downie | G01F 15/005 137/455 |
| 2015/0357228 A1 | 12/2015 | Busche et al. | |
| 2016/0007411 A1 | 1/2016 | Busche et al. | |
| 2016/0007412 A1 | 1/2016 | Busche et al. | |
| 2016/0216713 A1 * | 7/2016 | Mudd | G05D 7/0635 |
| 2016/0223377 A1 * | 8/2016 | Behrens | G01F 1/86 |
| 2016/0225646 A1 | 8/2016 | Rice et al. | |
| 2016/0239026 A1 * | 8/2016 | Nagase | G01F 1/6847 |
| 2016/0240410 A1 | 8/2016 | Reuter et al. | |
| 2016/0252912 A1 | 9/2016 | Horwitz | |
| 2016/0372348 A1 * | 12/2016 | Sawachi | H01J 37/32449 |
| 2017/0102719 A1 | 4/2017 | Halusic et al. | |
| 2017/0199529 A1 | 7/2017 | Ding | |
| 2017/0370763 A1 * | 12/2017 | Brashear | G01F 25/15 |
| 2018/0245955 A1 * | 8/2018 | Arai | G01L 9/0002 |
| 2018/0283914 A1 * | 10/2018 | Sugita | G01F 1/50 |
| 2019/0017855 A1 * | 1/2019 | Sawada | G01F 1/34 |
| 2019/0137309 A1 * | 5/2019 | Sawada | G01F 25/10 |
| 2020/0232873 A1 * | 7/2020 | Nagase | G05D 7/0635 |

OTHER PUBLICATIONS

Busche, U.S. Appl. No. 14/920,758, titled: "Optical Fiber Temperature Sensors, Temperature Monitoring Aparatus, and Manufactureing Methods", filed Oct. 22, 2015.

Travis Morey, U.S. Appl. No. 15/177,183, titled: "High Flow Gas Diffuser Assemblies, Systems, and Methods", filed Jun. 8, 2016.

Madiwal et al., U.S. Appl. No. 15/238,604, titled: "Gas Systems and Mehtods for Chamber Ports", filed Aug. 16, 2016.

HA-MFV, "High Accuracy Mass Flow Verifier Enables Wafer-to-Wafer, Chamber-to-Chamber, & Tool-to-Tool Process Matching", MKS 2012, www.MKSINST.com.

International Search Report of International Application No. PCT/US2017/033073, dated Aug. 23, 2017.

\* cited by examiner

METHODS, SYSTEMS, AND APPARATUS FOR MASS FLOW VERIFICATION BASED ON CHOKED FLOW

RELATED APPLICATION

This application is a continuation of U.S. patent application Ser. No. 15/194,360, filed Jun. 27, 2016, which is herein incorporated by reference in its entirety.

FIELD

This disclosure relates to electronic device manufacturing and, more particularly, to verifying mass flow rates of mass flow controllers based on choked flow principles.

BACKGROUND

Electronic device manufacturing systems may include one or more mass flow controllers (MFCs). MFCs control the mass flow rates of process chemistries used in the manufacture of electronic devices. Process chemistries may include various gases (e.g., cleaning, deposition, and etchant gases) that are delivered to one or more process chambers in which electronic circuits may be fabricated on semiconductor wafers, glass plates, or the like. Precise mass flow control of process chemistries may be used in one or more steps of an electronic device's fabrication process. Precise mass flow control provided by MFCs may contribute to high yield production of electronic devices having microscopically small dimensions.

To ensure that process chemistries are delivered accurately, verification and calibration of MFC's may be performed periodically. However, verifying and calibrating MFCs may involve additional bulky and expensive equipment that may be time-consuming and inefficient to use, may be limited to low mass flow rate ranges (e.g., up to only 3000 seem (standard cubic centimeter per minute) nitrogen equivalent), may result in notable process downtime, and/or may not be sufficiently accurate to ensure precise mass flow control of process chemistries.

SUMMARY

According to a first aspect, a mass flow verification system is provided. The mass flow verification system comprises an inlet; a first pressure sensor and a temperature sensor each coupled downstream of the inlet; a plurality of isolation valves coupled downstream of the inlet; a plurality of differently-sized flow restrictors coupled in parallel and downstream of the inlet, each one of the plurality of differently-sized flow restrictors coupled in series with the inlet and a respective one of the plurality of isolation valves; an outlet coupled downstream of and in series with each one of the plurality of differently-sized flow restrictors; and a controller coupled to the first pressure sensor, the temperature sensor, and the plurality of isolation valves, wherein the controller is configured to determine a mass flow rate in response to a temperature measured by the temperature sensor under a choked flow condition and a first pressure measured by the first pressure sensor under the choked flow condition.

According to a second aspect, an electronic device manufacturing system is provided. The electronic device manufacturing system comprises a mass flow controller; a mass flow verification system having an inlet and an outlet, the inlet coupled to the mass flow controller; a controller; and a process chamber coupled to a flow path coupled to the mass flow controller and configured to receive one or more process chemistries via the mass flow controller. The mass flow verification system comprises a plurality of isolation valves coupled downstream of the inlet, and a plurality of differently-sized flow restrictors coupled in parallel and downstream of the inlet, each one of the plurality of differently-sized flow restrictors coupled in series with the inlet, a respective one of the plurality of isolation valves, and the outlet. The controller is coupled to the plurality of isolation valves and is configured to receive a pressure measurement and a temperature measurement upstream of the plurality of differently-sized flow restrictors under a choked flow condition through only one of the plurality of isolation valves. The controller is also configured to determine a mass flow rate in response to receiving the pressure measurement and the temperature measurement.

According to a third aspect, a method of verifying a mass flow rate is provided. The method comprises causing a gas to flow through only one of a plurality of differently-sized flow restrictors during a choked flow condition; measuring a pressure upstream of the one of the plurality of differently-sized flow restrictors to obtain a measured pressure value during the choked flow condition; measuring a temperature upstream of the one of the plurality of differently-sized flow restrictors to obtain a measured temperature value during the choked flow condition; and determining a mass flow rate by applying a predetermined flow restrictor coefficient, a predetermined gas correction factor, and a predetermined temperature value to the measured pressure value and the measured temperature value.

Still other aspects, features, and advantages in accordance with these and other embodiments of the disclosure may be readily apparent from the following detailed description, the appended claims, and the accompanying drawings. Accordingly, the drawings and descriptions herein are to be regarded as illustrative in nature, and not as restrictive.

BRIEF DESCRIPTION OF DRAWINGS

The drawings, described below, are for illustrative purposes only and are not necessarily drawn to scale. The drawings are not intended to limit the scope of the disclosure in any way.

DETAILED DESCRIPTION

Figure 1:
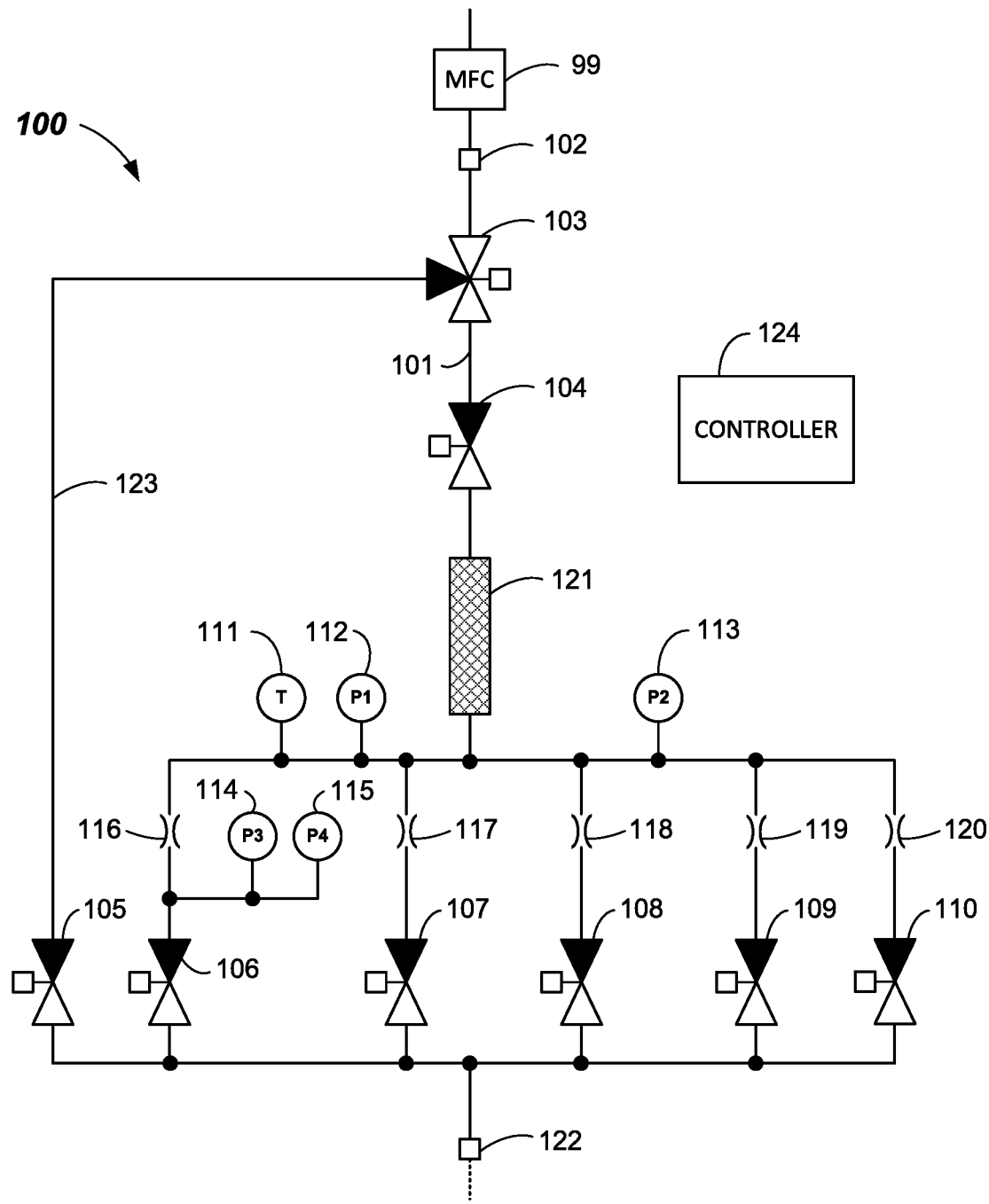
FIG. 1 illustrates a first mass flow verification system according to embodiments of the disclosure.

Reference will now be made in detail to example embodiments of the disclosure, which are illustrated in the accompanying drawings. Wherever possible, the same reference numbers will be used throughout the drawings to refer to the same or like parts.

Electronic devices having microscopically small dimensions may be produced with process chemistries having mass flow rate accuracies as high as +/−1%. Many mass flow controllers (MFCs) may be specified as such and may meet those specifications when new, while a small percentage of MFCs may be specified as such, but may not actually meet them when new or otherwise. Furthermore, even initially accurate MFCs may over time experience an accuracy drift in their mass flow rates that may render them outside of their specified accuracies. Accordingly, verification and calibration of MFCs, such as those used in semiconductor fabrication equipment, may be performed periodically to ensure that process chemistries are delivered accurately.

Mass flow verification methods, systems, and apparatus in accordance with one or more embodiments of the disclosure are based on choked flow principles for determining a gas mass flow rate, which may be in units of "sccm" (standard cubic centimeters per minute) or "slm" (standard liters per minute). Mass flow verification methods, systems, and apparatus based on choked flow principles in accordance with one or more embodiments of the disclosure may reduce the number of variables needed to calculate mass flow rate, may result in a smaller verification equipment footprint, and may be more time efficient and at least as accurate as, if not more accurate than, mass flow verification methods, systems, and apparatus based on known ROR (pressure rate of rise) principles.

ROR principles are based on ideal gas law to correlate a mass flow rate with a measured pressure rate of rise in a known enclosed volume. The higher the mass flow rate, the larger (should be) the enclosed volume. ROR principles may involve a lengthy process (e.g., 10 or more hours in some cases) of filling an enclosed volume with a gas and measuring a pressure rate of rise within the enclosed volume. The enclosed volume may be a process chamber of a manufacturing system or an external volume. Uncertainties in the exact volume of a process chamber or external volume may adversely affect the accuracy of the results. A process using ROR principles may involve measurements of pressure, temperature, volume, and time.

In contrast, non-ROR choked flow measurement may be almost instantaneous, and calculating a mass flow rate based on choked flow principles may involve just two measurements—pressure and temperature.

According to choked flow principles, the velocity of a gas flowing through a restrictive pathway (e.g., the narrowest part of the pathway) initially increases as the pressure difference across the restriction increases. Choked flow occurs when the pressure difference becomes large enough to increase gas flow velocity to the speed of sound (i.e., sonic velocity) at the restriction, or choke point. In other words, choked flow occurs at a particular minimum ratio of pressure upstream of the choke point to pressure downstream of the choke point. During choked flow, the velocity of the gas does not increase above the speed of sound at the choke point no matter how large the pressure difference becomes. A choke point may be provided by a device known as a flow restrictor. Flow restrictors are available in many different sizes (i.e., the diameter or cross-sectional area of the orifice or flow path through the restrictor).

Mass flow rate (MFR) through a flow restrictor during choked flow varies linearly with pressure upstream of the flow restrictor. Mass flow verification in accordance with one or more embodiments of the disclosure may employ the following two equations:

$$\text{FlowSTD MFR} = P\text{CHARACTERIZATION} * C\text{FLOWRESTR} \quad (1)$$

$$\text{Verified MFR} = P\text{MFV} * C\text{FLOWRESTR} * (T\text{CHARACTERIZATION}/T\text{MFV}) * C\text{GAS CORRECTION} \quad (2)$$

where:

Equation (1) is used during a characterization (described below) of each of the differently-sized flow restrictors used in mass flow verification systems in accordance with one or more embodiments of the disclosure;

Equation (2) is used during mass flow verification of an MFC to determine a mass flow rate (i.e., Verified MFR);

temperature and pressure values are in absolute units (i.e., degrees Kelvin for temperature values and Torr for pressure values);

nitrogen may be a reference gas used to characterize the differently-sized flow restrictors;

PCHARACTERIZATION is a measured upstream pressure of nitrogen flowing at a known mass flow rate (i.e., FlowSTD MFR) through a given flow restrictor under a choked flow condition during characterization of that given flow restrictor;

CFLOWRESTR (flow restrictor coefficient) is a ratio of a known mass flow rate (FlowSTD MFR) over a measured pressure (PCHARACTERIZATION) for a given flow restrictor as calculated in Equation 1; values of CFLOWRESTR for each characterized flow restrictor may be stored in a memory of a controller configured to control a mass flow verification system in accordance with one or more embodiments of the disclosure; CFLOWRESTR is used in Equation 2 to solve for Verified MFR;

TCHARACTERIZATION is a measured temperature of nitrogen during characterization of a given flow restrictor; values of TCHARACTERIZATION for each characterized flow restrictor may be stored in a memory of a controller configured to control a mass flow verification system in accordance with one or more embodiments of the disclosure;

PMFV is a measured upstream pressure of a target gas (i.e., the process chemistry whose mass flow rate is controlled by an MFC being verified) under a choked flow condition through a given flow restrictor during mass flow verification, wherein the given flow restrictor should have been previously characterized;

TMFV is a measured upstream temperature of the target gas under the choked flow condition through the given flow restrictor during mass flow verification; and CGAS CORRECTION (gas correction factor) is the square root of a ratio of the molecular weight of nitrogen over the molecular weight of the target gas (i.e., the process chemistry whose mass flow rate is controlled by an MFC being verified). This factor corrects for differences between nitrogen and non-nitrogen gases that may be flowed during mass flow verification, and values of CGAS CORRECTION for various gases that may be used during mass flow verification may be stored in a memory of a controller configured to control a mass flow verification system in accordance with one or more embodiments of the disclosure.

Mass flow verification methods, systems, and apparatus in accordance with one or more embodiments of the disclosure may use a plurality of differently-sized flow restrictors coupled in parallel to induce choked flow for a mass flow rate range of an MFC used in a gas delivery apparatus of an electronic device manufacturing system. Choked flow conditions may be created by maintaining a minimum upstream/downstream pressure ratio across the plurality of differently-sized flow restrictors. The minimum upstream/downstream pressure ratio that induces choked flow may be known or can be determined for each of the gases used in electronic device manufacturing. The number of differently-sized flow restrictors is determined by the range of mass flow rates to be verified; the wider the flow rate range, the more differently-sized flow restrictors may be included. Embodiments of the methods, systems, and apparatus described herein can be expanded to accommodate various mass flow rate ranges used in electronic device manufacturing.

Each differently-sized flow restrictor may be characterized via a test setup to measure a resulting upstream pressure during a choked flow condition for one or more mass flow rates to be verified. This may ensure that an upstream pressure of a particular flow restrictor that may be used in a mass flow verification system in accordance with embodiments of the disclosure does not starve an MFC to be verified. That is, in order to function properly, an MFC should have a certain pressure differential thereacross. If an upstream pressure resulting from a particular mass flow rate through a particular flow restrictor causes an insufficient pressure differential across an MFC, then that flow restrictor cannot be used to verify that MFC at that mass flow rate. Thus, embodiments of the disclosure employ a plurality of differently-sized flow restrictors coupled in parallel such that an appropriate flow restrictor can be selected to provide a choked flow path without starving the MFC to be verified.

A test setup for characterizing flow restrictors may include a precision MFC coupled to an inlet of a flow path having an upstream pressure sensor (e.g., a manometer), an upstream temperature sensor, a flow restrictor to be characterized, and a downstream pressure sensor (e.g., a manometer) coupled in series. The outlet of the flow path may be coupled to a vacuum pump to create a base vacuum pressure at the outlet, which may be, e.g., 5 Torr (other base vacuum pressures may be used). Once the base vacuum pressure is established, the precision MFC can be set to a particular mass flow rate (referred to herein as a set point) and nitrogen can be flowed through the flow path. Measurement of upstream and downstream pressures can then be made to ensure that the minimum upstream/downstream pressure ratio exists to induce choked flow through the flow restrictor and that the upstream pressure does not starve the MFC.

The following are example results of characterized 100-micron, 400-micron, and 800-micron flow restrictors each having nitrogen flowed there through at a base vacuum pressure of 5 Torr for the mass flow rate ranges shown:

100 Micron Flow Restrictor
A) mass flow rate=5 sccm
upstream pressure=71.4 Torr
downstream pressure=5.0 Torr
B) mass flow rate=45 sccm
upstream pressure=621.5 Torr
downstream pressure=5.0 Torr
400 Micron Flow Restrictor
A) mass flow rate=30 sccm
upstream pressure=26.2 Torr
downstream pressure=5.0 Torr
B) mass flow rate=700 sccm
upstream pressure=600.6 Torr
downstream pressure=5.7 Torr
800 Micron Flow Restrictor
A) mass flow rate=400 sccm
upstream pressure=86.1 Torr
downstream pressure=5.2 Torr
B) mass flow rate=3000 sccm
upstream pressure=648.1 Torr
downstream pressure=12.7 Torr The results for each characterized flow restrictor may be stored in a memory of a controller controlling the mass flow verification system. These results may allow the controller to select an appropriately-sized flow restrictor to be used to verify a mass flow rate of an MFC during a choked flow condition without starving the MFC.

Further details of example embodiments illustrating and describing the various aspects above, as well as other aspects including methods of verifying a mass flow rate, will be explained in greater detail below in connection with FIGS. 1-6.

Mass flow verification methods, systems, and apparatus in accordance with one or more embodiments of the disclosure may include reduced-pressure (i.e., vacuum-based) applications employing, e.g., mass flow verification systems 100 and 200, and atmospheric (i.e., ambient pressure based) applications employing, e.g., mass flow verification systems 300 and 400, as now described.

FIG. 1 illustrates a mass flow verification system 100 in accordance with one or more embodiments. Mass flow verification system 100 may be used in low-flow reduced-pressure applications. In some embodiments, low flow applications may include mass flow rates up to about 2500 sccm, for example.

A mass flow controller (MFC) 99 may be coupled to mass flow verification system 100 at inlet 102 of mass flow verification system 100. In some embodiments, MFC 99 may represent a plurality of MFCs coupled to inlet 102 via a common manifold or header having a common outlet, wherein MFC 99 as described below may represent the one MFC of the plurality of MFCs to be verified (i.e., the only MFC of the plurality of MFCs flowing gas during verification). MFC 99 may be a part of, or coupled to, a gas delivery apparatus of an electronic device manufacturing system. MFC 99 may be configured to flow a gas at one or more specified mass flow rates (i.e., one or more set points) to one or more process chambers of the electronic device manufacturing system. Mass flow verification system 100 is configured to verify one or more of the specified mass flow rates of MFC 99 based on choked flow principles.

Mass flow verification system 100 may include a plurality of isolation valves 103-110, a temperature sensor 111, a plurality of pressure sensors 112-115, a plurality of differently-sized flow restrictors 116-120, a gas temperature acclamation accelerator 121, and an outlet 122. Outlet 122 may be coupled to a foreline (i.e., a vacuum line to a system vacuum pump) of the electronic device manufacturing system to establish a base vacuum pressure at outlet 122.

The plurality of isolation valves 103-110 may be coupled downstream of inlet 102. Isolation valves 103 and 105 may be part of a bypass flow path 123 coupled between inlet 102 and outlet 122 that bypasses the plurality of differently-sized flow restrictors 116-120. Isolation valves 103 and 105 and bypass flow path 123 may enable pumping and purging of mass flow verification system 100 after measurement of hazardous gases that may be provided by gas delivery apparatus via MFC 99. Isolation valve 104 may be a main verification system valve. Isolation valves 103-110 may each be any suitable electronically-controllable isolation valve capable of stopping gas flow there through across a range of pressures provided by the gas delivery apparatus and the electronic device manufacturing system to which mass flow verification system 100 is connected and by the choked flow conditions created within mass flow verification system 100.

The plurality of differently-sized flow restrictors 116-120 are coupled in parallel and downstream of inlet 102. Each of the differently-sized flow restrictors 116-120 may be configured for a different maximum flow rate there through (which may be referred to as "conductance") than the other differently-sized flow restrictors 116-120. For example, in some embodiments, flow restrictor 116 may have the highest flow rate there through, while flow restrictor 117 may have a high flow rate there through, but less than flow restrictor 116. Flow restrictor 118 may have a medium flow rate there through (i.e., less than flow restrictors 116 and 117), while flow restrictor 119 may have a low flow rate there through (i.e., less than each of flow restrictors 116-118). And flow restrictor 120 may have the lowest flow rate there through (i.e., less than each of flow restrictors 116-119). In some embodiments, the highest flow rate may be about 5000 sccm and the lowest flow rate may be about 5 sccm, for example. In some embodiments, the differently-sized flow restrictors 116-120 may be precision flow restrictors. In other embodiments, standard flow restrictors may be used.

As shown in FIG. 1, each one of the differently-sized flow restrictors 116-120 is coupled in series with inlet 102 and a respective one of isolation valves 106-110. That is, flow restrictor 116 is coupled in series with isolation valve 106, flow restrictor 117 is coupled in series with isolation valve 107, flow restrictor 118 is coupled in series with isolation valve 108, flow restrictor 119 is coupled in series with isolation valve 109, and flow restrictor 120 is coupled in series with isolation valve 110. In some embodiments as shown, the differently-sized flow restrictors 116-120 are coupled upstream of their respective isolation valves 106-110.

In other embodiments, the number of differently-sized flow restrictors and their respective series-coupled isolation valve may be more or less than that shown, depending on the range of mass flow rates to be verified by mass flow verification system 100. The greater the range of mass flow rates to be verified, the larger the number of series-connected differently-sized flow restrictor/isolation valve pairs.

Temperature sensor 111 and pressure sensors 112 and 113 may each be coupled downstream of inlet 102 and upstream of differently-sized flow restrictors 116-120. Pressure sensors 114 and 115 may be coupled downstream of flow restrictor 116 (i.e., the flow restrictor having the highest flow rate). Temperature sensor 111 may be a thermocouple, and each of pressure sensors 112-115 may be a manometer. In some embodiments, temperature sensor 111 may include more than one thermocouple, and one or more of pressure sensors 112-155 may include more than one manometer. In some embodiments, pressure sensors 112 and 115 may each be a 100 Torr manometer, pressure sensor 113 may be a 1000 Torr manometer, and pressure sensor 114 may a 10 Torr manometer. Other embodiments may have pressure sensors of other Torr values. Furthermore, some embodiments may have only one of pressure sensors 112 and 113 and only one of pressure sensors 114 and 115, depending on the range of mass flow rates to be verified by mass flow verification system 100.

The gas temperature acclamation accelerator 121 may be coupled upstream of temperature sensor 111. The gas temperature acclamation accelerator 121 may be used to ensure uniform gas temperature distribution upstream of the flow restrictors 116-120, which may improve the accuracy of mass flow verification system 100. The gas temperature acclamation accelerator 121 may be an inactive structure that includes a porous mesh material having an optimum amount of surface area that may result in negligible, if any, pressure drop there through.

Mass flow verification system 100 may further include a controller 124. Controller 124 may control the operation of and be electronically (or otherwise) coupled to isolation valves 103-110, temperature sensor 111, and pressure sensors 112-115. Controller 124 may be, e.g., a general purpose computer and/or may include a microprocessor or other suitable computer processor or CPU (central processing unit) capable of executing computer readable instructions/software routines. Controller 124 may include a memory for storing data and computer readable instructions/software routines executable thereon. Flow restrictor characterization data may be stored in the memory of controller 124.

Controller 124 may be configured via user input commands and the stored computer readable instructions/software routines to set a set point for MFC 99, select a flow path through one of the differently-sized flow restrictors 116-120, control the opening and closing of each of the isolation valves 103-110, record and process temperature and pressure measurements via temperature sensor 111 and pressure sensors 112-115, and determine mass flow rates based on the recorded temperature and pressure measurements and Equation 2, as described herein. Controller 124 may also be configured to control other aspects of mass flow verification system 100, including, e.g., input/output peripherals, power supplies, clock circuits, and/or the like.

In some embodiments, controller 124 may not be included in mass flow verification system 100. Instead, controller 124 may be, e.g., a system controller of an electronic device manufacturing system to which mass flow verification system 100 is connected. Data and computer readable instructions/software routines configured to operate mass flow verification system 100 for verifying mass flow rates as described herein may be stored on a non-transitory computer-readable medium, such as, e.g., a removable storage disk or device. The data and computer readable instructions/software routines may be transferred from the non-transitory computer-readable medium to the system controller to perform mass flow verification.

Mass flow verification system 100 may be operated by setting MFC 99 via controller 124 to a desired mass flow rate (i.e., a desired set point) to be verified and then flowing a gas through the highest flow pathway (i.e., through flow restrictor 116) via controller 124, which may connect the highest flow pathway to MFC 99 by closing isolation valves 105 and 107-110 and opening isolation valves 103 and 104 (for flow through main flow path 101) and isolation valve 106 (for flow through flow restrictor 116). Pressure measurements may be recorded by controller 124 via one of downstream pressure sensors 114 or 115 (this may depend on the base vacuum pressure set at outlet 122 via a system vacuum pump connected thereto and on the pressure ratings of pressure sensors 114 and 115—note that in some embodiments, as described above, 10 Torr may be the maximum pressure measurable by pressure sensor 114, while 1000 Torr may be the maximum pressure measurable by pressure sensor 113). Similarly, pressure measurements may be recorded by controller 124 via pressure sensor 112 or 113. Controller 124 may then determine whether the minimum upstream/downstream pressure ratio for inducing choked flow is present. In some embodiments, this may occur when upstream pressure is greater than twice the downstream pressure.

Because isolation valves 106-110 are downstream of the differently-sized flow restrictors 116-120, the highest flow pathway should be initially selected first to measure downstream pressure to confirm choked flow. Furthermore, pressure sensors 114 and 115 may only be coupled to the highest flow pathway, because coupling similar pairs of pressure sensors downstream of each of the differently-sized flow restrictors 116-120 may be cost prohibitive.

In response to determining that a minimum upstream/downstream pressure ratio for choked flow is present (i.e., establishing that a choked flow condition exists), controller 124 may select an appropriate one of the differently-sized flow restrictors 116-120 based on stored characterization data (by opening and closing corresponding isolation valves 103-110) to verify a set point of MFC 99. The selected flow restrictor is one that maintains choked flow there through at the set point of MFC 99 to be verified without the resulting upstream pressure of that flow restrictor exceeding a threshold value and causing MFC 99 to starve (as determined during characterization). Upstream temperature and pressure measurements may then be made via temperature sensor 111 and one of pressure sensors 112 or 113. Controller 124 may determine a mass flow rate using Equation 2. This process may be repeated for verifying other mass flow rates of MFC 99. If a determined mass flow rate is found to be outside of MFC 99's specified accuracy, MFC 99 may be adjusted (if possible) or replaced.

Figure 2:
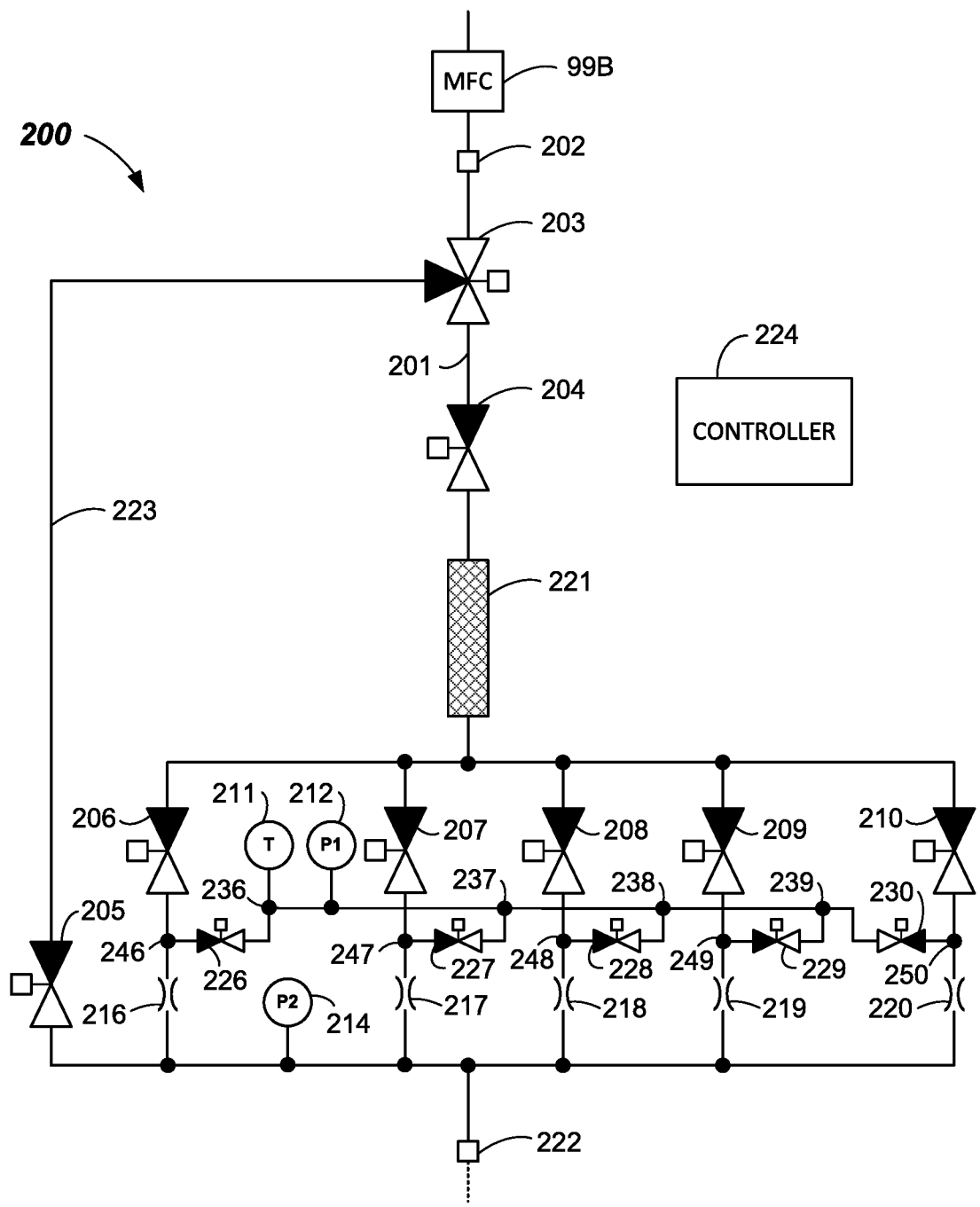
FIG. 2 illustrates a second mass flow verification system according to embodiments of the disclosure.

FIG. 2 illustrates another mass flow verification system 200 in accordance with one or more embodiments. Mass flow verification system 200 may be used in high-flow reduced-pressure applications (i.e., vacuum-based applications). In some embodiments, high flow applications may include mass flow rates up to about 50 slm, for example, while in other embodiments, no upper mass flow rate limitation may apply. Alternatively, mass flow verification system 200 may also be used in low-flow reduced-pressure applications.

A mass flow controller (MFC) 99B may be coupled to mass flow verification system 200 at inlet 202 of mass flow verification system 200. In some embodiments, MFC 99B may represent a plurality of MFCs coupled to inlet 202 via a common manifold or header having a common outlet, wherein MFC 99B as described below may represent the one MFC of the plurality of MFCs to be verified (i.e., the only MFC of the plurality of MFCs flowing gas during verification). MFC 99B may be a part of, or coupled to, a gas delivery apparatus of an electronic device manufacturing system. MFC 99B may be configured to flow a gas at one or more specified mass flow rates (i.e., one or more set points) to one or more process chambers of the electronic device manufacturing system. Mass flow verification system 200 is configured to verify one or more of the specified mass flow rates of MFC 99B based on choked flow principles.

Mass flow verification system 200 may include a plurality of isolation valves 203-210 and 226-230, a temperature sensor 211, pressure sensors 212 and 214, a plurality of differently-sized flow restrictors 216-220, a gas temperature acclamation accelerator 221, and an outlet 222. Outlet 222 may be coupled to a foreline (i.e., a vacuum line to a system vacuum pump) of the electronic device manufacturing system to establish a base vacuum pressure at outlet 222.

The plurality of isolation valves 203-210 and 226-230 may be coupled downstream of inlet 102. Isolation valves 203 and 205 may be part of a bypass flow path 223 coupled between inlet 202 and outlet 222 that bypasses the plurality of differently-sized flow restrictors 216-220. Isolation valves 203 and 205 and bypass flow path 223 may enable pumping and purging of mass flow verification system 200 after measurement of hazardous gases that may be provided by gas delivery apparatus via MFC 99B. Isolation valve 204 may be a main verification system valve. Isolation valves 203-210 and 226-230 may each be any suitable electronically-controllable isolation valve capable of stopping gas flow there through across a range of pressures provided by the gas delivery apparatus and the electronic device manufacturing system to which mass flow verification system 200 is connected and by the choked flow conditions within mass flow verification system 200.

The plurality of differently-sized flow restrictors 216-220 are coupled in parallel and downstream of inlet 202. Each of the differently-sized flow restrictors 216-220 is configured to allow a different maximum flow rate there through than the other differently-sized flow restrictors 216-220. In some embodiments, for example, flow restrictor 216 may have the highest flow rate there through, while flow restrictor 217 may have a high flow rate there through, but less than flow restrictor 216. Flow restrictor 218 may have a medium flow rate there through (i.e., less than flow restrictors 216 and 217), while flow restrictor 219 may have a low flow rate there through (i.e., less than each of flow restrictors 216-218). And flow restrictor 220 may have the lowest flow rate there through (i.e., less than each of flow restrictors 216-219). In some embodiments, the differently-sized flow restrictors 216-220 may be precision flow restrictors. In other embodiments, standard flow restrictors may be used.

As shown in FIG. 2, each one of the differently-sized flow restrictors 216-220 is coupled in series with inlet 202 and a respective one of isolation valves 206-210. That is, flow restrictor 216 is coupled in series with isolation valve 206, flow restrictor 217 is coupled in series with isolation valve 207, flow restrictor 218 is coupled in series with isolation valve 208, flow restrictor 219 is coupled in series with isolation valve 209, and flow restrictor 220 is coupled in series with isolation valve 210. In some embodiments as shown, the differently-sized flow restrictors 216-220 are coupled downstream of their respective isolation valves 206-210.

In other embodiments, the number of differently-sized flow restrictors and their respective series-coupled isolation valve may be more or less than that shown depending on the range of mass flow rates to be verified by mass flow verification system 200. The greater the range of mass flow rates to be verified, the larger the number of series-connected differently-sized flow restrictor/isolation valve pairs.

Temperature sensor 211 and pressure sensor 212 may each be coupled downstream of inlet 202 and upstream of the differently-sized flow restrictors 216-220. Pressure sensor 214 may be coupled downstream of the differently-sized flow restrictors 216-220. As shown in FIG. 2, each one of the sub-plurality of isolation valves 226-230 has a respective first port 236-239 (except isolation valve 230 which shares first port 239 with isolation valve 229) coupled to temperature sensor 211 and to pressure sensor 212. Each one of the sub-plurality of isolation valves 226-230 also has a second port coupled between a respective one of the differently-sized flow restrictors 216-220 and a respective one of isolation valves 206-210. That is, isolation valve 226 has a second port 246 coupled between flow restrictor 216 and isolation valve 206, isolation valve 227 has a second port 247 coupled between flow restrictor 217 and isolation valve 207, isolation valve 228 has a second port 248 coupled between flow restrictor 218 and isolation valve 208, isolation valve 229 has a second port 249 coupled between flow restrictor 219 and isolation valve 209, and isolation valve 230 has a second port 250 coupled between flow restrictor 220 and isolation valve 210.

In some embodiments, the sub-plurality of isolation valves 226-230 may each be a suitable mini-valve configured to allow temperature sensor 211 and pressure sensor 212 to accurately measure temperature and pressure, respectively, upstream of each one of the differently-sized flow restrictors 216-220 when its corresponding isolation valve 226-230 is open.

Temperature sensor 211 may be a thermocouple, and pressure sensors 212 and 214 may each be a manometer. In some embodiments, temperature sensor 211 may include more than one thermocouple, and pressure sensor 212 and/or 214 may include more than one manometer. In some embodiments, pressure sensor 212 may be a 1000 Torr manometer, and pressure sensor 214 may a 10 Torr manometer. Other embodiments may have pressure sensors of other Torr values and/or may have more than two pressure sensors, depending on the range of mass flow rates to be verified by mass flow verification system 200.

The gas temperature acclamation accelerator 221 may be coupled upstream of temperature sensor 211. The gas temperature acclamation accelerator 221 may be used to ensure uniform gas temperature distribution upstream of the flow restrictors 216-220, which may improve the accuracy of mass flow verification system 200. The gas temperature acclamation accelerator 221 may be an inactive structure that includes a porous mesh material having an optimum amount of surface area that may result in negligible, if any, pressure drop there through.

Mass flow verification system 200 may further include a controller 224. Controller 224 may control the operation of and be electronically (or otherwise) coupled to isolation valves 203-210 and 226-230, temperature sensor 211, and pressure sensors 212 and 214. Controller 224 may be, e.g., a general purpose computer and/or may include a microprocessor or other suitable computer processor or CPU (central processing unit) capable of executing computer readable instructions/software routines. Controller 224 may include a memory for storing data and computer readable instructions/software routines executable thereon. Flow restrictor characterization data may be stored in the memory of controller 224.

Controller 224 may be configured via user input commands and the stored computer readable instructions/software routines to set a set point for MFC 99B, select a flow path through one of the differently-sized flow restrictors 216-220, control the opening and closing of each of the isolation valves 203-210 and 226-230, record and process temperature and pressure measurements via temperature sensor 211 and pressure sensors 212 and 214, and determine mass flow rates based on the recorded temperature and pressure measurements and Equation 2, as described herein. Controller 224 may also be configured to control other aspects of mass flow verification system 200, including, e.g., input/output peripherals, power supplies, clock circuits, and/or the like.

In some embodiments, controller 224 may not be included in mass flow verification system 200. Instead, controller 224 may be, e.g., a system controller of an electronic device manufacturing system to which mass flow verification system 200 is connected. Data and computer readable instructions/software routines configured to operate mass flow verification system 200 for verifying mass flow rates as described herein may be stored on a non-transitory computer-readable medium, such as, e.g., a removable storage disk or device. The data and computer readable instructions/software routines may be transferred from the non-transitory computer-readable medium to the system controller to perform mass flow verification.

Mass flow verification system 200 may be operated by setting MFC 99B via controller 224 to a desired mass flow rate (i.e., a desired set point) to be verified, selecting via controller 224 an appropriate flow path through one of differently-sized flow restrictors 216-220 based on stored characterization data (wherein controller 224 opens and closes the appropriate isolation valves 203-210 and 226-230), taking downstream pressure measurements via pressure sensor 214 (to confirm choked flow) and upstream temperature and pressure measurements via temperature sensor 211 and pressure sensor 212, and determining via controller 224 a mass flow rate using Equation 2. This process may be repeated for verifying other mass flow rates of MFC 99B. If a determined mass flow rate is found to be outside of MFC 99B's specified accuracy, MFC 99B may be adjusted (if possible) or replaced. Note that unlike mass flow verification system 100, flowing gas through the highest flow path first is not done in mass flow verification system 200 because pressure sensor 214 is coupled such that downstream pressure may be directly measured at each of differently-sized flow restrictors 216-220.

Figure 3:
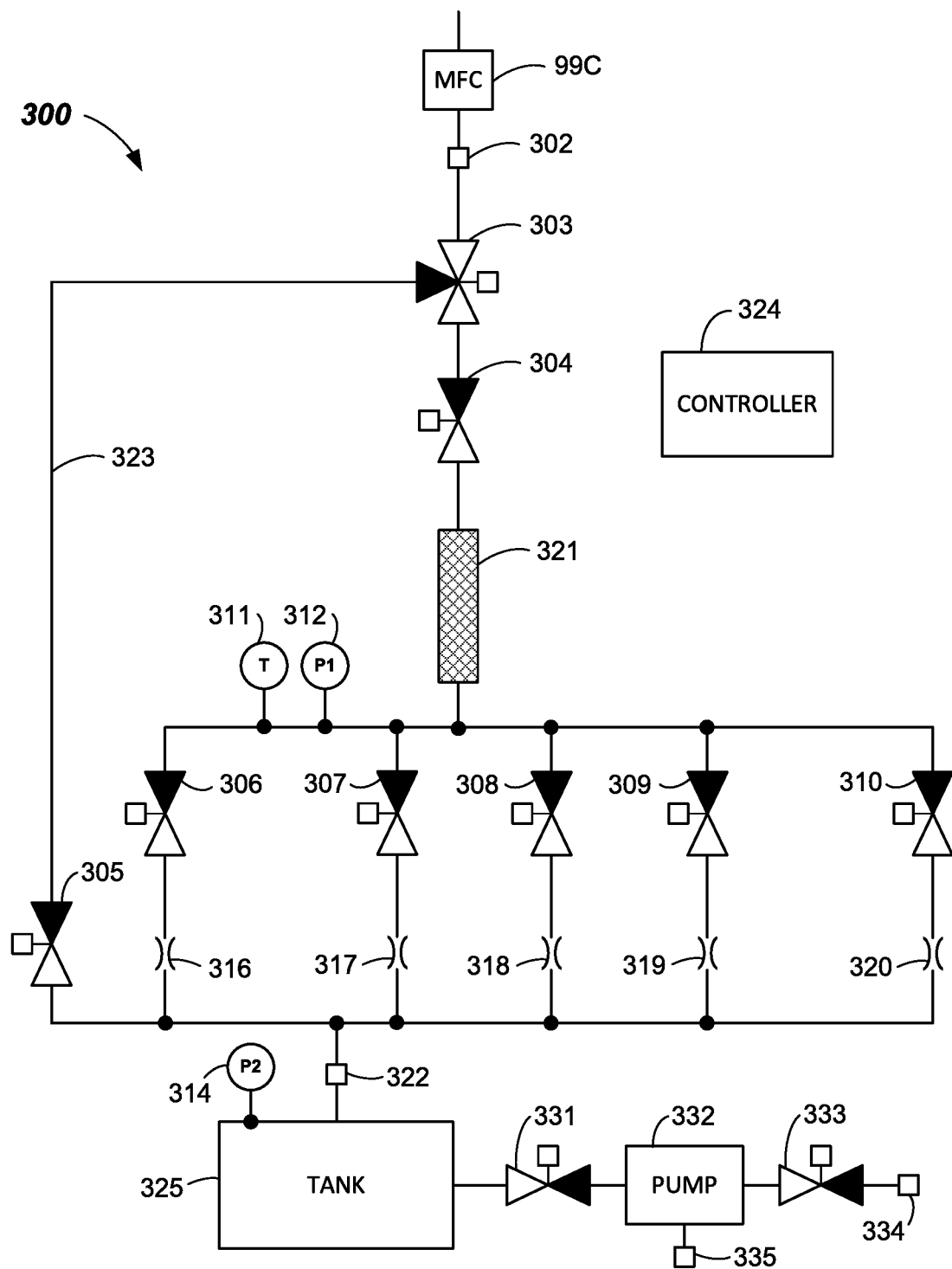
FIG. 3 illustrates a third mass flow verification system according to embodiments of the disclosure.

FIG. 3 illustrates another mass flow verification system 300 in accordance with one or more embodiments. Mass flow verification system 300 may be used in atmospheric applications (i.e., non-vacuum applications) and, alternatively, may be also in reduced-pressure applications, as described further below.

A mass flow controller (MFC) 99C may be coupled to mass flow verification system 300 at inlet 302 of mass flow verification system 300. In some embodiments, MFC 99C may represent a plurality of MFCs coupled to inlet 302 via a common manifold or header having a common outlet, wherein MFC 99C as described below may represent the one MFC of the plurality of MFCs to be verified (i.e., the only MFC of the plurality of MFCs flowing gas during verification). MFC 99C may be a part of, or coupled to, a gas delivery apparatus of an electronic device manufacturing system. MFC 99C may be configured to flow a gas at one or more specified mass flow rates (i.e., one or more set points) to one or more process chambers of the electronic device manufacturing system. Mass flow verification system 300 is configured to verify one or more of the specified mass flow rates of MFC 99C based on choked flow principles.

Mass flow verification system 300 may include a plurality of isolation valves 303-310, 331, and 333; a temperature sensor 311; pressure sensors 312 and 314, a plurality of differently-sized flow restrictors 316-320, a gas temperature acclamation accelerator 321, an outlet 322, a dead-end tank 325, a vacuum pump 332, and an input port 334.

Input port 334 may be coupled to a source of CDA (clean dry air) or nitrogen. Vacuum pump 332 may be, e.g., a venturi vacuum generator, and may have an exhaust port 335 that may be coupled to an abatement system of an electronic device manufacturing system or other suitable apparatus for receiving discharged gases. Dead-end tank 325 may have a volume of, e.g., about 25 liters. Dead-end tank 325 may have other volumes in other embodiments.

The plurality of isolation valves 303-310, 331, and 333 may be coupled downstream of inlet 302. Isolation valves 303 and 305 may be part of a bypass flow path 323 coupled between inlet 302 and outlet 322 that bypasses the plurality of differently-sized flow restrictors 316-320. Isolation valve 304 may be a main verification system valve. Isolation valves 303-310, 331, and 333 may be any suitable electronically-controllable isolation valve capable of stopping gas flow there through across a range of pressures created by vacuum pump 332 and the choked flow conditions within mass flow verification system 300.

The plurality of differently-sized flow restrictors 316-320 are coupled in parallel and downstream of inlet 302. Each of the differently-sized flow restrictors 316-320 is configured to allow a different maximum flow rate there through than the other differently-sized flow restrictors 316-320. In some embodiments, for example, flow restrictor 316 may have the highest flow rate there through, while flow restrictor 317 may have a high flow rate there through, but less than flow restrictor 316. Flow restrictor 318 may have a medium flow rate there through (i.e., less than flow restrictors 316 and 317), while flow restrictor 319 may have a low flow rate there through (i.e., less than each of flow restrictors 316-318) And flow restrictor 320 may have the lowest flow rate there through (i.e., less than each of flow restrictors 316-319). In some embodiments, the differently-sized flow restrictors 316-320 may be precision flow restrictors. In other embodiments, standard flow restrictors may be used.

As shown in FIG. 3, each one of the differently-sized flow restrictors 316-320 is coupled in series with inlet 302 and a respective one of isolation valves 306-310. That is, flow restrictor 316 is coupled in series with isolation valve 306, flow restrictor 317 is coupled in series with isolation valve 307, flow restrictor 318 is coupled in series with isolation valve 308, flow restrictor 319 is coupled in series with isolation valve 309, and flow restrictor 320 is coupled in series with isolation valve 310. In some embodiments as shown, the differently-sized flow restrictors 316-320 are coupled downstream of their respective isolation valves 306-310.

In other embodiments, the number of differently-sized flow restrictors and their respective series-coupled isolation valve may be more or less than that shown depending on the range of mass flow rates to be verified by mass flow verification system 300. The greater the range of mass flow rates to be verified, the larger the number of series-connected differently-sized flow restrictor/isolation valve pairs.

Temperature sensor 311 and pressure sensor 312 may each be coupled downstream of inlet 302 and upstream of flow restrictors 316-320. Pressure sensor 314 may be coupled downstream of flow restrictors 316-320 and in particular to dead-end tank 325. Temperature sensor 311 may be a thermocouple, and pressure sensors 312 and 314 may each be a manometer. In some embodiments, temperature sensor 311 may include more than one thermocouple, and pressure sensor 312 and/or 314 may include more than one manometer. In some embodiments, pressure sensor 312 may be a 1000 Torr manometer, and pressure sensor 314 may a 10 Torr manometer. Other embodiments may have pressure sensors of other Torr values and/or may have more than two pressure sensors, depending on the range of mass flow rates to be verified by mass flow verification system 300 and the base vacuum pressure established by vacuum pump 332.

The gas temperature acclamation accelerator 321 may be coupled upstream of temperature sensor 311. The gas temperature acclamation accelerator 321 may be used to ensure uniform gas temperature distribution upstream of the flow restrictors 316-320, which may improve the accuracy of mass flow verification system 300. The gas temperature acclamation accelerator 321 may be an inactive structure that includes a porous mesh material having an optimum amount of surface area that may result in negligible, if any, pressure drop there through.

As shown in FIG. 3, dead-end tank 325 is coupled to outlet 322 and downstream of and in series with each one of the differently-sized flow restrictors 316-320. Vacuum pump 332 is coupled downstream of dead-end tank 325 and in series between dead-end tank 325 and input port 334. The dead-end tank 325, vacuum pump 332, and isolation valves 331 and 333 have been included in mass flow verification system 300 to create choked flow conditions across flow restrictors 316-320 for a sufficient period of time during which mass flow verification may be performed, as described further below.

Mass flow verification system 300 may further include a controller 324. Controller 324 may control the operation of and be electronically (or otherwise) coupled to isolation valves 303-310, 331, and 333, temperature sensor 311, pressure sensors 312 and 314, and vacuum pump 332. Controller 324 may be, e.g., a general purpose computer and/or may include a microprocessor or other suitable computer processor or CPU (central processing unit) capable of executing computer readable instructions/software routines. Controller 324 may include a memory for storing data and computer readable instructions/software routines executable thereon. Flow restrictor characterization data may be stored in the memory of controller 324.

Controller 324 may be configured via user input commands and the stored computer readable instructions/software routines to set a set point for MFC 99C, select a flow path through one of the differently-sized flow restrictors 316-320, control the opening and closing of each of the isolation valves 303-310, 331, and 333, set a base vacuum pressure via vacuum pump 332, record and process temperature and pressure measurements via temperature sensor 311 and pressure sensors 312 and 314, and determine mass flow rates based on the recorded temperature and pressure measurements and Equation 2, as described herein. Controller 324 may also be configured to control other aspects of mass flow verification system 300, including, e.g., input/output peripherals, power supplies, clock circuits, and/or the like.

In some embodiments, controller 324 may not be included in mass flow verification system 300. Instead, controller 324 may be, e.g., a system controller of an electronic device manufacturing system to which mass flow verification system 300 is connected. Data and computer readable instructions/software routines configured to operate mass flow verification system 300 for verifying mass flow rates as described herein may be stored on a non-transitory computer-readable medium, such as, e.g., a removable storage disk or device. The data and computer readable instructions/software routines may be transferred from the non-transitory computer-readable medium to the system controller to perform mass flow verification.

Prior to mass flow verification, MFC 99C may be set to a zero set point (that is, no flow there through), isolation valves 304, any one of 306-310, 331, and 333 may be opened, and vacuum pump 332 may be operated to create a base vacuum pressure in dead-end tank 325 and at outlet 322 sufficient to create choked flow conditions across differently-sized flow restrictors 316-320 during mass flow verification. The base vacuum pressure may range in some embodiments from 200 Torr to 1 Torr, and once achieved, isolation valves 331 and 333 may be closed.

In response to establishment of a base vacuum pressure, mass flow verification system 300 may be operated by setting MFC 99C via controller 324 to a desired mass flow rate (i.e., a desired set point) to be verified, selecting via controller 324 an appropriate flow path through one of differently-sized flow restrictors 316-320 based on stored characterization data (wherein controller 324 opens and closes the appropriate isolation valves 303-310), measuring downstream pressure via pressure sensor 314 (to measure the base vacuum pressure) and measuring upstream temperature and pressure via temperature sensor 311 and pressure sensor 312. Note that the base vacuum pressure initially established in dead-end tank 325 and at outlet 322 may be temporary as gas flows through the selected flow path into dead-end tank 325. Thus, the choked flow condition across the flow restrictor in the selected flow path may also be temporary and, accordingly, the measurements of temperature and pressure should be made during the time that choked flow is maintained.

Figure 3A:
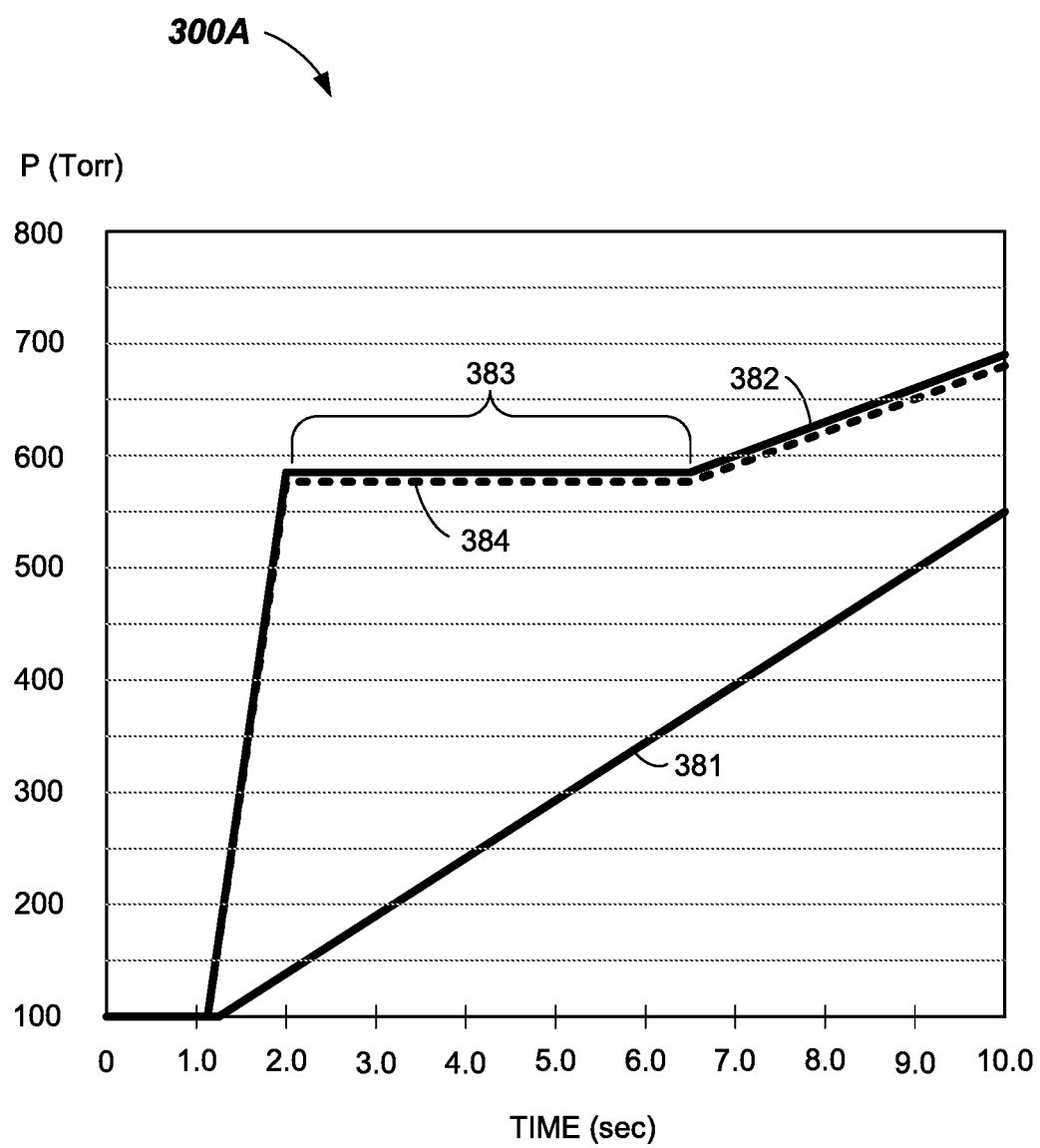
FIG. 3A illustrates a graph of several pressures during mass flow verification within the third mass flow verification system according to embodiments of the disclosure.

FIG. 3A illustrates a graph 300A of pressure versus time in mass flow verification system 300 in accordance with one or more embodiments of the disclosure. Pressure curve 381 represents a pressure measured by downstream pressure sensor 314 at dead-end tank 325, and pressure curve 382 represents a pressure measured by upstream pressure sensor 312. Shortly after gas begins flowing through MFC 99C (i.e., at about 1 sec), the vacuum pressure in dead-end tank 325 begins to steadily rise, as shown by pressure curve 381. Pressure measured by upstream pressure sensor 312 also rises, but then remains constant for about 4.5 seconds, in some embodiments, before rising again, as shown by pressure curve 382. Choked flow occurs during this constant pressure choked flow duration 383. Accordingly, upstream temperature and pressure measurements should be made during this time which, in some embodiments, is between about 2.0 to 6.5 seconds after initiating gas flow through MFC 99C.

Furthermore, because pressure sensor 312 is coupled upstream of isolation valves 306-310, which are upstream of differently-sized flow restrictors 316-320, pressure measurements made by pressure sensor 312 may not be the same as those that would have been made directly upstream of differently-sized flow restrictors 316-320 (i.e., between a flow restrictor and its respective isolation valve). FIG. 3A also includes a pressure curve 384 that represents a pressure that would be measured directly upstream of one of flow restrictors 316-320 if a respective pressure sensor were located between each one of the differently-sized flow restrictors 316-320 and isolation valves 306-310. Although the difference between the two pressures may be small, as indicated by pressure curves 382 and 384 (e.g., about 10 Torr in some embodiments), the difference may be enough to adversely affect the accuracy of the determined mass flow rate for verification purposes.

Therefore, in order to determine an accurate mass flow rate, the pressure measured by pressure sensor 312 may be converted to a pressure value that would have been measured had a pressure sensor been located directly upstream of the flow restrictor in the selected flow path. In some embodiments, a suitable model-based computation algorithm based on known fluid mechanics may be used to account for the pressure difference between the location of pressure sensor 312 and locations directly upstream of each one of differently-sized flow restrictors 316-320.

The data shown in FIG. 3A may be based on analyses of an MFC set point of 100 slm of hydrogen ramping up in one second, a 25 liter dead-end tank with a 2.5 mm orifice and a 0.7 conductance valve, 100 Torr initial base vacuum pressure, and pressure downstream of the MFC maintained under 600 Torr to prevent MFC starvation.

In response to measuring the upstream temperature and converting the measured upstream pressure, controller 324 may determine a mass flow rate using Equation 2. This process may be repeated for verifying other mass flow rates of MFC 99C. If a determined mass flow rate is found to be outside of the specified accuracy of MFC 99C, MFC 99C may be adjusted (if possible) or replaced.

In some embodiments, mass flow verification system 300 may not include dead-end tank 325, wherein vacuum pump 332 may be directly coupled to outlet 322. In these embodiments, vacuum pump 332 may be capable of 50 slm or higher continuous flow, which may be sufficient to maintain a stable base vacuum pressure during verification.

Figure 4:
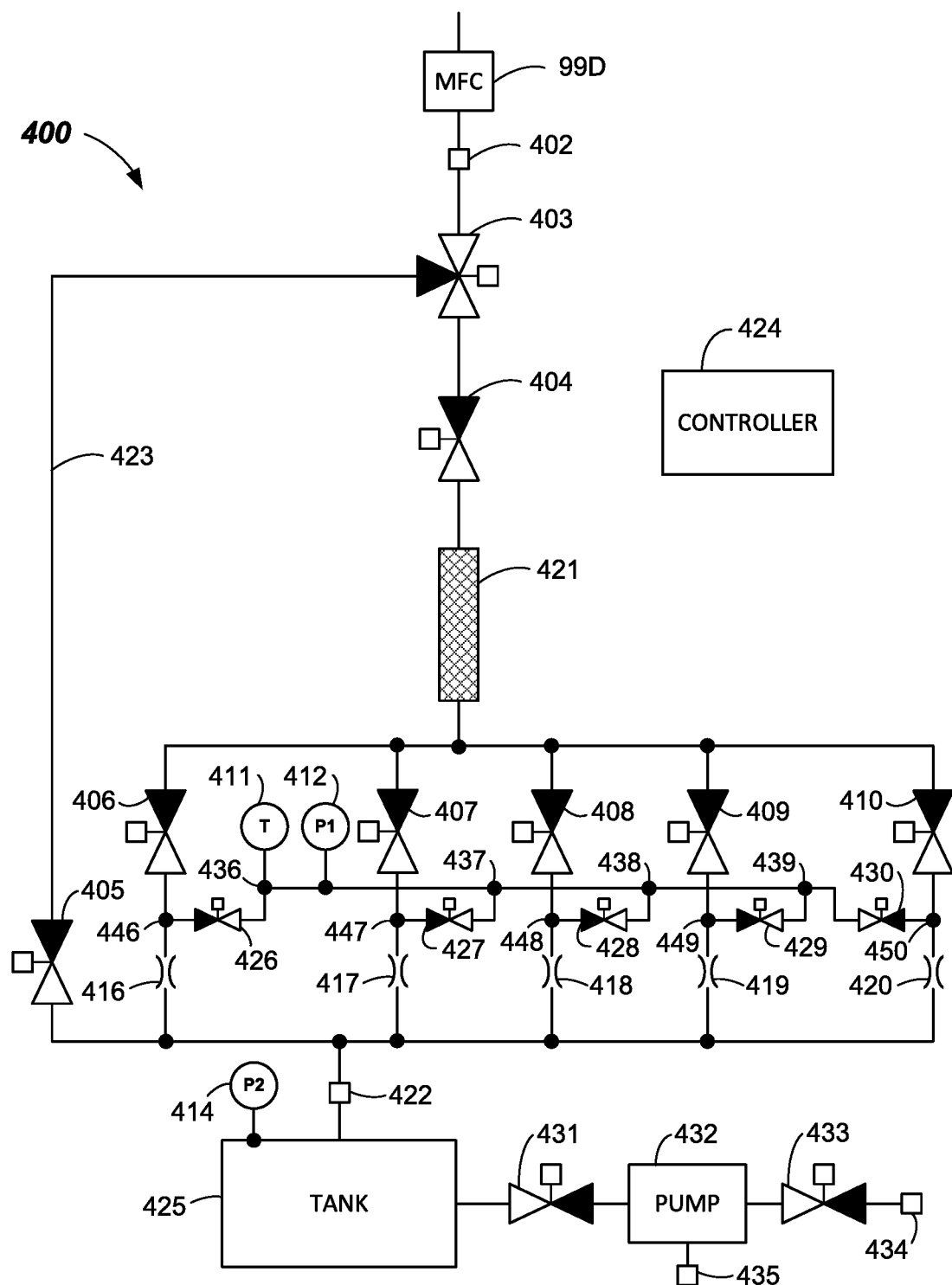
FIG. 4 illustrates a fourth mass flow verification system according to embodiments of the disclosure.

FIG. 4 illustrates another mass flow verification system 400 in accordance with one or more embodiments. Mass flow verification system 400 may be used in atmospheric applications (i.e., non-vacuum applications) and, alternatively, may also be used in reduced-pressure applications.

A mass flow controller (MFC) 99D may be coupled to mass flow verification system 400 at inlet 402 of mass flow verification system 400. In some embodiments, MFC 99D may represent a plurality of MFCs coupled to inlet 402 via a common manifold or header having a common outlet, wherein MFC 99D as described below may represent the one MFC of the plurality of MFCs to be verified (i.e., the only MFC of the plurality of MFCs flowing gas during verification). MFC 99D may be a part of, or coupled to, a gas delivery apparatus of an electronic device manufacturing system. MFC 99D may be configured to flow a gas at one or more specified mass flow rates (i.e., one or more set points) to one or more process chambers of the electronic device manufacturing system. Mass flow verification system 400 is configured to verify one or more of the specified mass flow rates of MFC 99D based on choked flow principles.

Mass flow verification system 400 may include a plurality of isolation valves 403-410, 426-430, 431, and 433; a temperature sensor 411; pressure sensors 412 and 414, a plurality of differently-sized flow restrictors 416-420, a gas temperature acclamation accelerator 421, an outlet 422, a dead-end tank 425, a vacuum pump 432, and an input port 434.

Input port 434 may be coupled to a source of CDA (clean dry air) or nitrogen. Vacuum pump 432 may be, e.g., a compact vacuum pump, and may have an exhaust port 435 that may be coupled to an abatement system of an electronic device manufacturing system or other suitable apparatus for receiving discharged gases. Dead-end tank 425 may have a volume of, e.g., about 25 liters. Dead-end tank 425 may have other volumes in other embodiments.

The plurality of isolation valves 403-410, 426-430, 431, and 433 may be coupled downstream of inlet 402. Isolation valves 403 and 405 may be part of a bypass flow path 423 coupled between inlet 402 and outlet 422 that bypasses the plurality of differently-sized flow restrictors 416-420. Isolation valve 404 may be a main verification system valve. Isolation valves 403-410, 426-430, 431, and 433 may be any suitable electronically-controllable isolation valve capable of stopping gas flow there through across a range of pressures created by vacuum pump 432 and the choked flow conditions within mass flow verification system 400.

The plurality of differently-sized flow restrictors 416-420 are coupled in parallel and downstream of inlet 402. Each of the differently-sized flow restrictors 416-420 is configured to allow a different maximum flow rate there through than the other differently-sized flow restrictors 416-420. In some embodiments, for example, flow restrictor 416 may have the highest flow rate there through, while flow restrictor 417 may have a high flow rate there through, but less than flow restrictor 416. Flow restrictor 418 may have a medium flow rate there through (i.e., less than flow restrictors 416 and 417), while flow restrictor 419 may have a low flow rate there through (i.e., less than each of flow restrictors 416-418). And flow restrictor 420 may have the lowest flow rate there through (i.e., less than each of flow restrictors 416-

419). In some embodiments, the differently-sized flow restrictors 416-420 may be precision flow restrictors. In other embodiments, standard flow restrictors may be used.

As shown in FIG. 4, each one of the differently-sized flow restrictors 416-420 is coupled in series with inlet 402 and a respective one of isolation valves 406-410. That is, flow restrictor 416 is coupled in series with isolation valve 406, flow restrictor 417 is coupled in series with isolation valve 407, flow restrictor 418 is coupled in series with isolation valve 408, flow restrictor 419 is coupled in series with isolation valve 409, and flow restrictor 420 is coupled in series with isolation valve 410. In some embodiments as shown, the differently-sized flow restrictors 416-420 are coupled downstream of their respective isolation valves 406-410.

In other embodiments, the number of differently-sized flow restrictors and their respective series-coupled isolation valve may be more or less than that shown depending on the range of mass flow rates to be verified by mass flow verification system 400. The greater the range of mass flow rates to be verified, the larger the number of series-connected differently-sized flow restrictor/isolation valve pairs.

Temperature sensor 411 and pressure sensor 412 may each be coupled downstream of inlet 402 and upstream of the differently-sized flow restrictors 416-420. Pressure sensor 414 may be coupled downstream of the differently-sized flow restrictors 416-420 and in particular to dead-end tank 425. As shown in FIG. 4, each one of the sub-plurality of isolation valves 426-430 has a respective first port 436-439 (except isolation valve 430 which shares first port 439 with isolation valve 429) coupled to temperature sensor 411 and to pressure sensor 412. Each one of the sub-plurality of isolation valves 426-430 also has a second port coupled between a respective one of the differently-sized flow restrictors 416-420 and a respective one of isolation valves 406-410. That is, isolation valve 426 has a second port 446 coupled between flow restrictor 416 and isolation valve 406, isolation valve 427 has a second port 447 coupled between flow restrictor 417 and isolation valve 407, isolation valve 428 has a second port 448 coupled between flow restrictor 418 and isolation valve 408, isolation valve 429 has a second port 449 coupled between flow restrictor 419 and isolation valve 409, and isolation valve 430 has a second port 450 coupled between flow restrictor 420 and isolation valve 410.

In some embodiments, the sub-plurality of isolation valves 426-430 may each be a suitable mini-valve configured to allow temperature sensor 411 and pressure sensor 412 to accurately measure temperature and pressure, respectively, directly upstream of each one of the differently-sized flow restrictors 416-420 when its corresponding isolation valve 426-430 is open.

Temperature sensor 411 may be a thermocouple, and pressure sensors 412 and 414 may each be a manometer. In some embodiments, temperature sensor 411 may include more than one thermocouple, and pressure sensor 412 and/or 414 may include more than one manometer. In some embodiments, pressure sensor 412 may be a 1000 Torr manometer, and pressure sensor 414 may a 10 Torr manometer. Other embodiments may have pressure sensors of other Torr values and/or may have more than two pressure sensors, depending on the range of mass flow rates to be verified by mass flow verification system 400.

The gas temperature acclamation accelerator 421 may be coupled upstream of temperature sensor 411. The gas temperature acclamation accelerator 421 may be used to ensure uniform gas temperature distribution upstream of the flow restrictors 416-420, which may improve the accuracy of mass flow verification system 400. The gas temperature acclamation accelerator 421 may be an inactive structure that includes a porous mesh material having an optimum amount of surface area that may result in negligible, if any, pressure drop there through.

As shown in FIG. 4, dead-end tank 425 is coupled to outlet 422 and downstream of and in series with each one of the differently-sized flow restrictors 416-420. Vacuum pump 432 is coupled downstream of dead-end tank 425 and in series between dead-end tank 425 and input port 434. The dead-end tank 425, vacuum pump 432, and isolation valves 431 and 433 have been included in mass flow verification system 400 to create choked flow conditions across flow restrictors 416-420 for a sufficient period of time during which mass flow verification may be performed, as described further below.

Mass flow verification system 400 may further include a controller 424. Controller 424 may control the operation of and be electronically (or otherwise) coupled to isolation valves 403-410, 426-430, 431, and 433; temperature sensor 411; pressure sensors 412 and 414, and vacuum pump 432. Controller 424 may be, e.g., a general purpose computer and/or may include a microprocessor or other suitable computer processor or CPU (central processing unit) capable of executing computer readable instructions/software routines. Controller 424 may include a memory for storing data and computer readable instructions/software routines executable thereon. Flow restrictor characterization data may be stored in the memory of controller 424.

Controller 424 may be configured via user input commands and the stored computer readable instructions/software routines to set a set point for MFC 99D, select a flow path through one of the differently-sized flow restrictors 416-420, control the opening and closing of each of the isolation valves 403-410, 426-430, 431, and 433; set a base vacuum pressure via vacuum pump 432; record and process temperature and pressure measurements via temperature sensor 411 and pressure sensors 412 and 414; and determine of mass flow rates based on the recorded temperature and pressure measurements and Equation 2, as described herein. Controller 424 may also be configured to control other aspects of mass flow verification system 400, including, e.g., input/output peripherals, power supplies, clock circuits, and/or the like.

In some embodiments, controller 424 may not be included in mass flow verification system 400. Instead, controller 424 may be, e.g., a system controller of an electronic device manufacturing system to which mass flow verification system 400 is connected. Data and computer readable instructions/software routines configured to operate mass flow verification system 400 for verifying mass flow rates as described herein may be stored on a non-transitory computer-readable medium, such as, e.g., a removable storage disk or device. The data and computer readable instructions/software routines may be transferred from the non-transitory computer-readable medium to the system controller to perform mass flow verification.

Prior to mass flow verification, MFC 99D may be set to a zero set point (that is, no flow there through), isolation valves 404, any one of 406-410, 431, and 433 may be opened, and vacuum pump 432 may be operated to create a base vacuum pressure in dead-end tank 425 and at outlet 422 sufficient to create choked flow conditions across the differently-sized flow restrictors 416-420 during mass flow verification. The base vacuum pressure may range in some embodiments from 200 Torr to 1 Torr, and once achieved, isolation valves 431 and 433 may be closed.

In response to establishment of a base vacuum pressure, mass flow verification system 400 may be operated by setting MFC 99D via controller 424 to a desired mass flow rate (i.e., a desired set point) to be verified, selecting via controller 424 an appropriate flow path through one of differently-sized flow restrictors 416-420 based on stored characterization data (wherein controller 424 opens and closes the appropriate isolation valves 403-410 and 426-430), measuring downstream pressure via pressure sensor 414 (to measure the base vacuum pressure), and measuring upstream temperature and pressure via temperature sensor 411 and pressure sensor 412.

As in mass flow verification system 300, these measurements should be made during the time that choked flow is maintained via dead-end tank 425, as illustrated by choked flow duration 383 of FIG. 3A, which in some embodiments may be about 2.0-6.5 seconds after initiating gas flow through MFC 99D. This choked flow duration may be based on analyses of an MFC set point of 100 slm of hydrogen ramping up in one second, a 25 liter dead-end tank with a 2.5 mm orifice and a 0.7 conductance valve, 100 Torr initial base vacuum pressure, and pressure downstream of the MFC maintained under 600 Torr to prevent MFC starvation.

Because pressure sensor 412 is coupled such that pressure measurements can be made directly upstream of the differently-sized flow restrictors 416-420, the pressure measurements do not need to be converted via model-based computation algorithms as in mass flow verification system 300.

In response to measuring upstream temperature and pressure, controller 424 may determine a mass flow rate using Equation 2. This process may be repeated for verifying other mass flow rates of MFC 99D. If a determined mass flow rate is found to be outside of the specified accuracy of MFC 99D, MFC 99D may be adjusted (if possible) or replaced.

In some embodiments, mass flow verification system 400 may not include dead-end tank 325, wherein vacuum pump 432 may be directly coupled to outlet 422. In these embodiments, vacuum pump 432 may be capable of 50 slm or higher continuous flow, which may be sufficient to maintain a stable base vacuum pressure during verification.

Although mass flow verification systems 300 and 400 include their own vacuum pump for atmospheric applications, each may be used in an electronic device manufacturing system employing its own system vacuum pump for reduced-pressure applications. In some reduced-pressure applications, connection from a system vacuum pump of an electronic device manufacturing system to a mass flow verification system outlet, such as, e.g., outlets 122 or 222, may not be direct. Instead, such a connection may involve several flow path restrictions and/or other complexities within the electronic device manufacturing system that may adversely affect the ability of the system vacuum pump to provide and maintain a stable and satisfactory base vacuum pressure to enable mass flow verification during choked flow in either mass flow verification system 100 or 200. Thus, the dead-end tank and vacuum pump arrangement of mass flow verification systems 300 and/or 400 may allow those systems to be alternatively used in such reduced-pressure applications to initially and quickly achieve a stable base vacuum pressure that temporarily maintains choked flow for mass flow verification.

Figure 5:
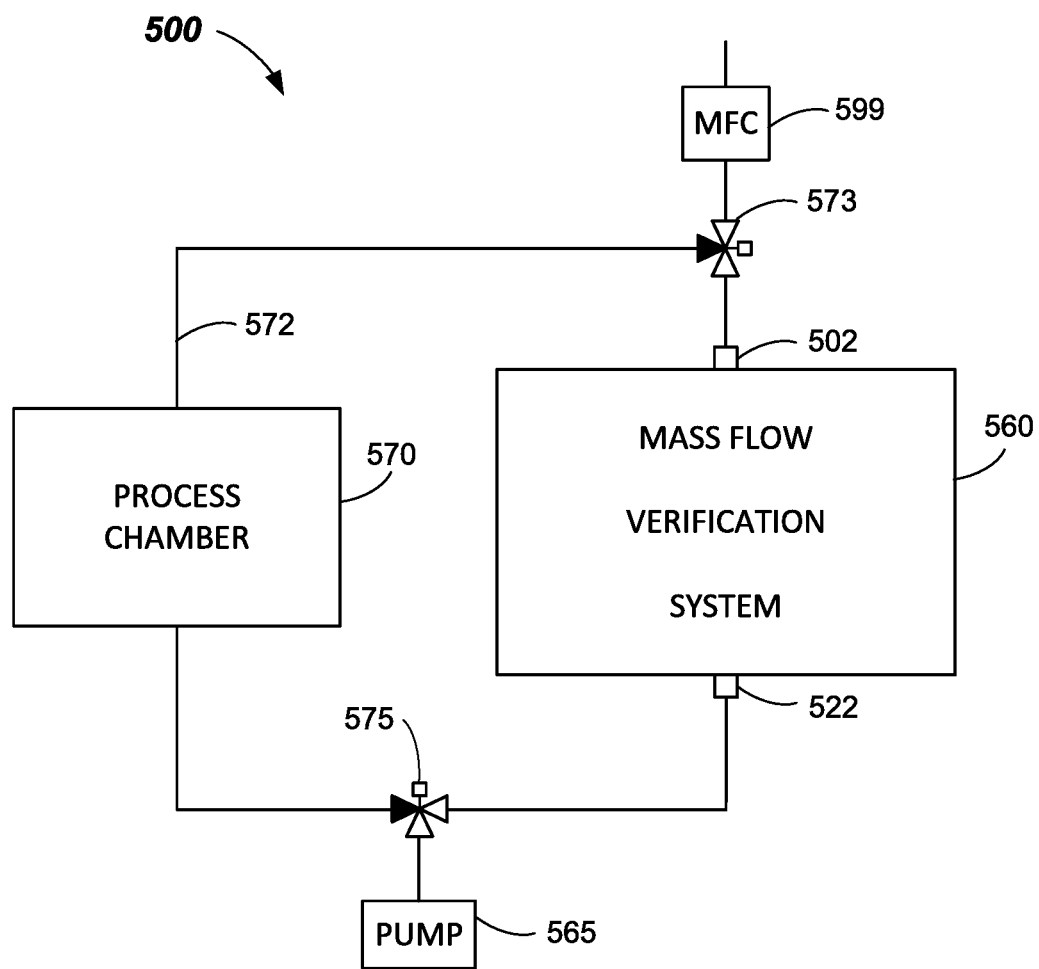
FIG. 5 illustrates an electronic device manufacturing system according to embodiments of the disclosure.

FIG. 5 illustrates an electronic device manufacturing system 500 in accordance with one or more embodiments. Electronic device manufacturing system 500 may include an MFC 599, a mass flow verification system 560, and a process chamber 570. In some embodiments, MFC 599 may represent a plurality of MFCs coupled via a common manifold or header to a common outlet, wherein MFC 599 as described below may represent the one MFC of the plurality of MFCs to be verified (i.e., the only MFC of the plurality of MFCs flowing gas during verification).

Process chamber 570 may be coupled to a flow path 572 coupled to mass flow controller 599 via an isolation valve 573. Process chamber 570 may be configured to receive one or more process chemistries via MFC 599 and to have a reduced-pressure chemical vapor deposition process, or a reduced-pressure epitaxy process, or one or more deposition, oxidation, nitration, etching, polishing, cleaning, and/or lithography processes performed therein.

Mass flow verification system 560 may have an inlet 502 and an outlet 522. Inlet 502 may be coupled to MFC 599 via isolation valve 573. Mass flow verification system 560 may be any one of mass flow verification systems 100, 200, 300, or 400.

In those embodiments where electronic device manufacturing system 500 operates under a reduced-pressure application, mass flow verification system 560 may be any one of mass flow verification systems 100, 200, 300, or 400. Mass flow verification system 560 may be coupled via outlet 522 to a system vacuum pump 565 of electronic device manufacturing system 500 via an isolation valve 575. System vacuum pump 565 may also be coupled to process chamber 570 via isolation valve 575.

In those embodiments where electronic device manufacturing system 500 operates under an atmospheric application, mass flow verification system 560 may be mass flow verification system 300 or 400. In these embodiments, system vacuum pump 565 may be excluded from electronic device manufacturing system 500.

The operation of electronic device manufacturing system 500 and/or mass flow verification system 560 may be controlled by a controller such as, e.g., one of controllers 124, 224, 324, or 424.

Figure 6:
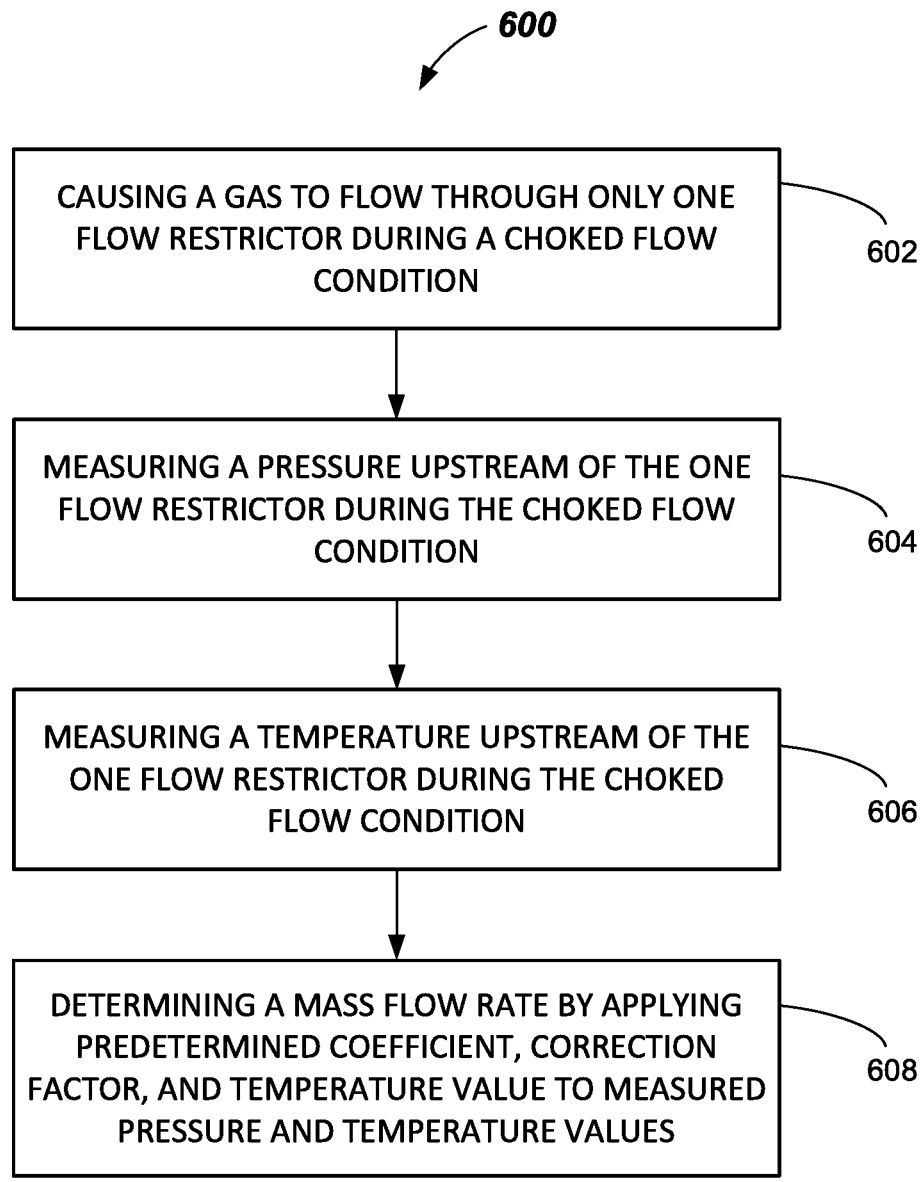
FIG. 6 illustrates a method of mass flow verification according to embodiments of the disclosure.

FIG. 6 illustrates a method 600 of verifying a mass flow rate in accordance with one or more embodiments. At process block 602, method 600 may include causing a gas to flow through only one of a plurality of differently-sized flow restrictors during a choked flow condition. For example, referring to FIG. 2, controller 224 may set MFC 99B to a particular mass flow rate, close isolation valves 205 and 207-210, open isolation valve 203 for flow through main flow path 201, and open isolation valves 204 and 206 to allow gas to flow from MFC 99B through only flow restrictor 216.

At process block 604, a pressure upstream of the one of the plurality of differently-sized flow restrictors may be measured to obtain a measured pressure value during the choked flow condition. For example, again referring to FIG. 2, controller 224 may open isolation valve 226 and close isolation valves 227-230 and receive a measured pressure value from pressure sensor 212.

At process block 606, method 600 may include measuring a temperature upstream of the one of the plurality of differently-sized flow restrictors to obtain a measured temperature value during the choked flow condition. Continuing with the FIG. 2 example, controller 224 may receive a measured temperature value from temperature sensor 211.

And at process block 606, method 600 may include determining a mass flow rate by applying a predetermined flow restrictor coefficient, a predetermined gas correction factor, and a predetermined temperature value to the measured pressure value and the measured temperature value. For example, controller 224 may determine a mass flow rate based on the measured values of pressure and temperature by applying Equation 2 and the appropriate predetermined flow restrictor coefficient, predetermined gas correction factor, and predetermined temperature value stored in a memory of controller 224 for flow restrictor 216 and the particular gas flowed there through.

The above process blocks of method 600 may be executed or performed in an order or sequence not limited to the order and sequence shown and described. For example, in some embodiments, process block 604 may be performed simultaneously with or after process block 606 (in such cases, the appropriate isolation values 226-230 are opened and closed as described for process block 604 prior to any temperature and/or pressure measurement).

In some embodiments, a non-transitory computer-readable medium, such as, e.g., a removable storage disk or device, may include computer readable instructions stored thereon that are capable of being executed by processor, such as, e.g., controllers 124-424, to perform process blocks 602, 604, 606, and 608 of method 600.

The foregoing description discloses only example embodiments of the disclosure. Modifications of the above-disclosed assemblies, apparatus, systems, and methods may fall within the scope of the disclosure. Accordingly, while example embodiments of the disclosure have been disclosed, it should be understood that other embodiments may fall within the scope of the disclosure, as defined by the following claims.

What is claimed is:

1. A method comprising:
preventing a flow of a target gas through an inlet;
creating a base vacuum pressure downstream of a first flow restrictor, wherein the first flow restrictor is coupled downstream of the inlet;
allowing the target gas to flow through the inlet and through the first flow restrictor;
monitoring pressure of the target gas upstream of the first flow restrictor;
identifying, based on the monitored pressure of the target gas, a limited-duration period of a choked flow of the target gas through the first flow restrictor, wherein the limited-duration period is followed by a period of increasing pressure of the target gas; and
determining, using a first pressure value of the target gas, a mass flow rate of the target gas, wherein the first pressure value of the target gas is obtained during the limited-duration period of the choked flow.

2. The method of claim 1, wherein creating the base vacuum pressure downstream of the first flow restrictor comprises:
causing a pump, coupled to a tank, to be operated, wherein the tank is coupled downstream of the first flow restrictor and upstream of an outlet.

3. The method of claim 2, wherein creating the base vacuum pressure downstream of the first flow restrictor further comprises preventing a flow of the target gas through the outlet.

4. The method of claim 1, wherein identifying the limited-duration period of the choked flow of the target gas through the first flow restrictor comprises:
monitoring pressure of the target gas downstream of the first flow restrictor.

5. The method of claim 4, wherein monitoring pressure of the target gas downstream of the first flow restrictor comprises using a second pressure sensor coupled to a tank, wherein the tank is coupled downstream of the first flow restrictor.

6. The method of claim 1, wherein duration of the limited-duration period of the choked flow is under 10 seconds.

7. The method of claim 1, wherein determining the mass flow rate of the target gas comprises:
determining a temperature value of the target gas upstream of the first flow restrictor.

8. The method of claim 7, wherein determining the mass flow rate of the target gas further comprises:
correcting for a difference between a molecular weight of the target gas and a molecular weight of a reference gas.

9. The method of claim 1, wherein:
preventing the flow of the target gas through the inlet comprises closing a first isolation valve coupled downstream of the inlet and in series with the first flow restrictor; and
allowing the target gas to flow through the inlet and through the first flow restrictor comprises opening the first isolation valve.

10. The method of claim 1, further comprising:
preventing a flow of the target gas through a second flow restrictor, wherein the second flow restrictor is coupled downstream of the inlet and in parallel to the first flow restrictor, and wherein the second flow restrictor is sized differently than the first flow restrictor.

11. The method of claim 10, wherein allowing the target gas to flow through the first flow restrictor and preventing the flow of the target gas through a second flow restrictor are in response to receiving an indication of a set value of a flow of the target gas through an outlet of a mass flow controller, wherein the outlet of the mass flow controller is upstream of the inlet.

12. The method of claim 10, wherein:
allowing the target gas to flow through the first flow restrictor comprises opening a first isolation valve coupled in series with the first flow restrictor; and
preventing the flow of the target gas through the second flow restrictor comprises closing a second isolation valve coupled in series with the second flow restrictor and in parallel to the first isolation valve.

13. The method of claim 1, wherein the base vacuum pressure is not to exceed 200 Torr.

14. A method of verifying a set mass flow rate of a gas, output by a mass flow controller, the method comprising:
receiving an indication of a set value of a flow of the gas through an outlet of the mass flow controller;
preventing a flow of the gas through an inlet, wherein the inlet is coupled downstream of the outlet of the mass flow controller;
determining that the set mass flow rate of the gas through a first flow restrictor is to occur under a choked flow condition, wherein the first flow restrictor is coupled downstream of the inlet;
preventing a flow of the gas through a second flow restrictor, wherein the second flow restrictor is coupled downstream of the inlet and in parallel to the first flow restrictor, and wherein the second flow restrictor is sized differently than the first flow restrictor;
creating a base vacuum pressure downstream of the first flow restrictor;
allowing the gas to flow through the inlet and through the first flow restrictor;
monitoring a first pressure of the gas upstream of the first flow restrictor;
identifying a limited-duration period of a choked flow of the gas through the first flow restrictor, wherein the limited-duration period is followed by a period of increasing pressure of the gas; and determining, using a first pressure value of the gas, a mass flow rate of the gas, wherein the first pressure value of the gas is a pressure value obtained during the limited-duration period of the choked flow.

* * * * *